(12) United States Patent
Matsui

(10) Patent No.: US 7,366,062 B2
(45) Date of Patent: Apr. 29, 2008

(54) OPTICAL HEAD DISK DEVICE

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 744 days.

(21) Appl. No.: 10/985,040

(22) Filed: Nov. 10, 2004

(65) Prior Publication Data
US 2005/0120363 A1    Jun. 2, 2005

(30) Foreign Application Priority Data
Nov. 12, 2003  (JP)  ............ P. 2003-381980

(51) Int. Cl.
*G11B 7/00* (2006.01)
(52) U.S. Cl. .............. 369/44.14; 369/112.01
(58) Field of Classification Search ...... None
See application file for complete search history.

(56) References Cited

U.S. PATENT DOCUMENTS

2002/0145815 A1 * 10/2002 Moriyama et al. ......... 359/819
2003/0021219 A1 * 1/2003 Nagai ....................... 369/244
2005/0216927 A1 * 9/2005 Amitani ..................... 720/651

FOREIGN PATENT DOCUMENTS

JP    A-3-165321    7/1991

* cited by examiner

*Primary Examiner*—Muhammad Edun
(74) *Attorney, Agent, or Firm*—Morgan, Lewis & Bockius LLP

(57) ABSTRACT

The optical head device for carrying recording/reproducing of data by irradiating a recording face of an optical disk with a laser beam, includes a base frame provided with an optical system for guiding the laser beam to the optical disk; and a sub-frame provided with a semiconductor laser for and fixed to the base frame. In this optical head device, a diamond-like carbon (DLC) film is formed on the mating faces of the base frame and the sub-frame, respectively.

5 Claims, 2 Drawing Sheets

OPTICAL HEAD DISK DEVICE

BACKGROUND OF THE INVENTION

1. Field of the Invention

This invention relates to a technique for facilitating replacement/repair of a laser output element in an optical head device for carrying out recording/reproducing by irradiating an optical disk with a laser beam.

2. Description of the Related Art

For example, in an optical head device for carrying out recording/reproducing for a CD (compact disk), DVD (digital versatile disk), an optical-disk for a blue-violet laser, etc., a configuration is known in which a frame (hereinafter referred to as a sub-frame) to which a semiconductor laser is attached is provided as a body separated from a base frame to which various optical systems for guiding a laser beam to the optical disk are attached, and the sub-frame is moved to carry out position alignment of the semiconductor laser when said sub-frame is secured to the base frame.

More specifically, the position alignment is carried out in such a manner that while the strength of the laser beam produced from the semiconductor laser is measured through an optical system of the base frame, the sub-frame to which the semiconductor laser is fixed is moved along a mating face of the base frame in X and Y directions vertical to an optical axis. The position with the highest detected strength of the laser beam is found as an optimum position, and the sub-frame is secured to the base frame at that position using e.g. screw.

Conventionally, it is general that the base frame is formed of e.g. zinc die-cast, and the sub-frame to which the semiconductor laser is attached is formed of e.g. aluminum so that it can serve as a heatsink plate for the semiconductor laser.

JP-A-3-165321 discloses a component assembled structure which is a technique preferably applied to the place where the optical head is attached to an electronic base plate.

In order to record data on the optical disk, a large laser output is required. In addition, in order to carry out the recording at a high speed, the required laser output also must increase. On the other hand, the semiconductor laser has a feature that it is likely to generate deterioration in a high output region.

Thus, as the head device in which write is carried out at the high speed prevails from now on, it is expected that in many cases, the replacement/repair of the semiconductor laser due to its deterioration is required.

However, as regards a conventional fixed structure of the semiconductor laser, it has been found that when replacement of the semiconductor laser is carried out, the following inconvenience occurs in many cases. Specifically, in the above fixed structure, since the base frame and sub-frame to which the semiconductor laser is attached are formed of a relatively soft metal such as zinc die-cast and aluminum, for example, at the time of the first alignment of the semiconductor laser or screwing of the sub-frame, deformation of a flaw or groove called "galling" may occur on the mating surfaces.

If the galling is generated, when the laser output element is replaced together with the sub-frame by a new element, the following inconvenience occurs. Namely, when the sub-frame is slid for position alignment of the semiconductor laser, the galling" generated on the mating surfaces hinders the sub-frame from being moved smoothly.

Such a problem may also occur in assembling a new product. Specifically, as a result of the decision that the semiconductor laser itself or its fixed position is defective after the sub-frame has been secured, where the semiconductor laser is replaced together with the sub-frame or the sub-frame is fixed again, the galling generated on the mating surfaces hinders such an operation as described above. Thus, the base frame and the step of attaching an optical system thereto are useless, which reduces the yield of the products.

It has been examined to apply the technique disclosed in JP-A-3-165321 to the place where the sub-frame with the semiconductor laser and the base frame are secured to each other. When a film member of fluororesin is inserted in between the mating faces of the sub-frame and the base frame, no galling is generated in the sub-frame and the base frame. However, since the film member is made of the resin, this film member is easily deformed owing to tightening of the sub-frame, thereby giving rise to various problems. For example, when the sub-frame is tightened strongly, the film member will be crushed to be damaged. Inversely, when the sub-frame is tightened weakly, the fixing position may be displaced over a long time of period owing to the elasticity generated by the deformation of the film member.

Further, JP-A-3-165321 also discloses a method of coating the mating surfaces with resin such as fluororesin. However, where a metal is coated with the fluororesin, the coated film is very likely to be peeled off. The base frame and sub-frame coated in this way cannot be adopted.

SUMMARY OF THE INVENTION

An object of this invention is to provide a structure with a laser output element attached to the base frame through a sub-frame, which permits strong fixing with no misalignment and is difficult to generate galling on the mating faces of the sub-frame and the base frame so that the sub-frame can be slid smoothly on the mating faces.

In order to attain the above object, in accordance with this invention, there is provided an optical head device for carrying out recording or reproducing of data by irradiating a recording face of an optical disk with a laser beam, comprising: a base frame provided with an optical system for guiding the laser beam to the optical disk; and a sub-frame provided with a laser output element for outputting the laser beam and fixed to the base frame, wherein a diamond-like carbon film is formed on at least one of mating faces of the base frame and the sub-frame.

In accordance with another aspect of this invention, at least one of mating faces of the base frame and the sub-frame is formed of a graphite plate, and fullerene gel or fullerene sol is applied to the mating face.

In accordance with still another aspect of this invention, one of mating faces of the base frame and the sub-frame is made of a member of Mohs hardness of 9 or more whereas the other thereof is made of a member of Mohs hardness of 6.

In accordance with these configurations, as compared with the case where a resin film is inserted as in JP-A-3-165321, the base frame and the sub-frame can be firmly secured to each other and the friction coefficient of the mating faces is reduced. For this reason, with the sub-frame being pressed on the base frame, when the sub-frame is slid or screw-fixed, galling is difficult to be generated on the mating faces. Thus, fixing and removal of the sub-frame can be carried out repeatedly under the same condition.

In accordance with a further aspect of this invention, lubricant doped with fine particles of perfluoro-system fluororesin (Teflon (trademark) and Diflon (trademark)) is applied to mating faces of the base frame and the sub-frame.

In such a configuration also, the base frame and the sub-frame can be firmly secured to each other and the friction coefficient of the mating faces is reduced, thereby making it difficult to generate galling on the mating faces.

In accordance with this invention, the replacement/repair of the laser output element due to its deterioration can be dealt with by replacement of the laser output element together with the sub-frame. In addition, the operation therefor can be carried out with no difficulty.

Further, when it is decided that there is a fault in the semiconductor laser and its position alignment during an assembling process of the optical head device, the operation of replacement of this part and making the position alignment again can be carried out with no difficulty, thereby enhancing the yield of the products.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
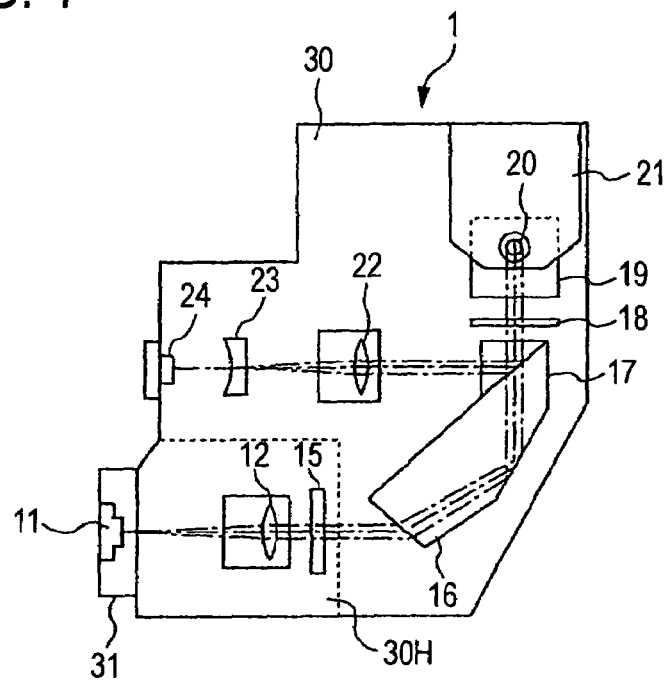
FIG. 1 is a view showing the entire configuration of an optical head device according to this embodiment.

Now referring to the drawings, an explanation will be given of various embodiments of this invention.

Embodiment 1

FIG. 1 is a view showing the entire configuration of an optical head device 1 according to this embodiment.

The optical head device 1 according to this embodiment serves to carry out the recording/reproducing of data on the recording face of e.g. a writable DVD. As seen from FIG. 1, the optical head device 1 includes a semiconductor laser 11 serving as a laser output means, a collimator lens 12 for collimating a laser beam emitted from the semiconductor laser 11, a diffraction grating 15 for making a plurality of beams from the laser beam thus collimated for focus control and tracking control, a prism 16 for bending an optical axis, a PBS (polarized beam splitter) 17 for separating a traveling beam to an optical head and a reflected beam from the optical disk from each other, a ¼ wavelength plate 18 for rotating the polarized beams of the traveling beam and reflected beam by 90 degree, an actuating mirror 19, an objective lens 20 for converging the laser beam on the recording face of the optical disk, an objective lens driving device 21 for driving this objective lens 20 in a focus direction and a tracking direction, a condenser lens 22 for condensing the reflected beam separated by the PBS 17, a concave cylindrical lens 23 for providing astigmatism to the reflected beam for the focus control and tracking control, and a 8-division sensor 24 for detecting the strength of the reflected.

The device frame of the optical head device 1 includes a base frame 30 and a sub-frame 31. The base frame 30 is formed of e.g. zinc die-cast and provided with the other component than the semiconductor laser 11. The sub-frame 31 is formed of e.g. aluminum molding member and provided with the semiconductor laser. The sub-frame 31 serves as a heatsink plate for the semiconductor laser 1.

Figure 2:
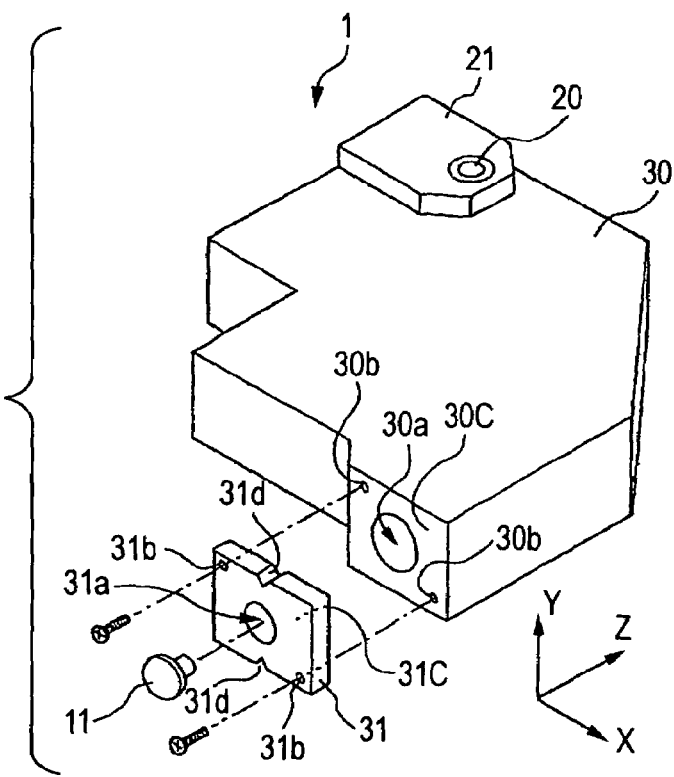
FIG. 2 is a separated-perspective view showing a structure for attaching the semiconductor laser.
Figure 3:
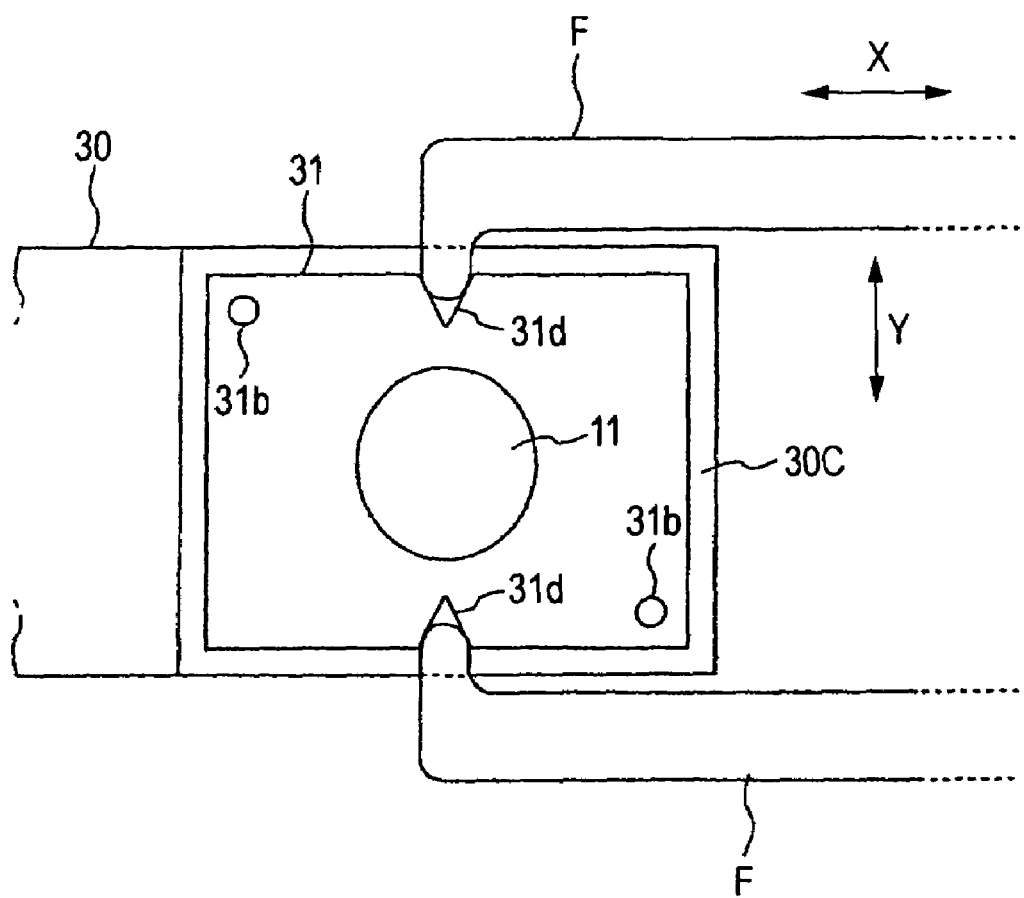
FIG. 3 is a front view showing the manner of adjusting the position alignment of the semiconductor laser fixed to a sub-frame.

FIG. 2 is a separated-perspective view showing a structure for attaching the semiconductor laser 11 of the optical head device 1. FIG. 3 is a front view showing the manner of carrying out the position alignment of the semiconductor laser 11.

The base frame 30 has a planar mating face 30C with the sub-frame. A diamond-like carbon (DLC) film is formed on the mating face 30C. The mating face 30C is provided with a slot 30a for passing a laser beam and screw slots 30b, 30b for screwing the sub-frame 31.

The sub-frame 31 is formed in a plate-like block shape provided with a planar mating face 31C with the base frame 30. A diamond-like carbon (DLC) is formed on the mating face 31C. Further, the sub-frame 31 is provided with a securing groove 31a, passing slots 31b, 31b for screwing and engagement grooves 31d, 31d which are to be sandwiched by arms F, F of a position alignment jig.

The semiconductor laser 11 is fit in the securing groove 31a of the sub-frame 31 and fixed to the sub-frame 31 by e.g. adhesive. The sub-frame 31 is fixedly screwed on the base frame 30 in a state where the mating 31C is superposed on the mating face 30C of the base frame 30.

Before screwing, as seen from FIG. 3, the sub-frame 31 is firmly sandwiched by movable arms F, F of the position alignment jig. In addition, with the sub-frame 31 being pressed on the base frame 30 by appropriate force, the movable arms F, F are moved in X and Y directions vertical to an optical axis to optimize the position alignment of the semiconductor laser 11. Upon completion of optimization, the screwing is carried out. As described above, during the position alignment, the sub-frame 31 is pressed on the base frame 30 to a certain degree. This intends to prevent the sub-frame 31 and base frame 30 from being misaligned during the screwing.

In accordance with the optical head device 1 according to this embodiment, since the diamond-like carbon (DLC) films are formed on the mating faces 30C and 31C of the base frame 30 and the sub-frame 31, respectively, even if the sub-frame 31 is strongly pressed on the base frame 30, the mating faces 30C and 31C can be given slidability with low friction because of the presence of the DLC films. Thus, the movable arms F, F of the position alignment jig can be moved smoothly in the X and Y directions so that the position alignment of the semiconductor laser can be made precisely.

As compared with the case where a fuluororesin having a certain thickness is inserted, the screwing can made firmly so that the sub-frame 30 and the base frame 31 can be firmly secured to each other.

Because of the provision of the DLC films, little galling is generated on the mating faces 30C and 31C of the sub-frame 31 and the base frame 30. Thus, even where the semiconductor laser 11 should be replaced owing to using deterioration, or it is detected that there is a fault in the semiconductor laser 11 and its securing position after the semiconductor laser 11 has been secured during an assembling process of the product, the sub-frame 31 can be taken out from the base frame 30 to attach the semiconductor laser 11 again in the same manner as described above.

Embodiment 2

In the second embodiment, graphite plates are boned to the mating areas between the base frame 30 and the sub-frame 31 so that the mating faces 30C and 31C are made of graphite. In addition, in securing the sub-frame 31 to the base frame 30, a fullerene gel (gel of a colloidal solution doped with fullerene) is applied to between the mating faces 30C and 31C.

Such a configuration also can give slidability with low friction to the mating faces 30C and 31C of the base frame 30 and the sub-frame 31 and make it difficult to generate galling even when the mating faces of the base frame 30 and the sub-frame 31 are strongly pressed to each other. Thus, the second embodiment can also provide the same effect as the first embodiment.

Incidentally, it should be noted that the above fullerene gel may be replaced by sol of silicon oil doped with fullerene described above.

Embodiment 3

In the third embodiment, a section 30H (e.g. section indicated by a dotted line in FIG. 1) of the base frame 30 which abuts on the sub-frame 31 is formed of a member of Mohs hardness of 6 or more such as ferrite. In addition, the sub-frame 31 is formed of a member of Mohs hardness of 9 or more such as diamond-like carbon.

Such a configuration also can give slidability with low friction to the mating faces 30C and 31C of the base frame 30 and the sub-frame 31 and make it difficult to generate galling even when the mating faces of the base frame 30 and the sub-frame 31 are strongly pressed to each other. Thus, the second embodiment can also provide the same effect as the first embodiment.

Incidentally, the member of Mohs hardness of 6 or may be feldspar, quartz or glass in place of ferrite described above. In the above configuration, the base frame was formed of the member of member of Mohs hardness of 6 or more, whereas the sub-frame 31 was formed of a member of Mohs hardness of 9 or more. However, inversely, the base frame 30 may be formed of the member of Mohs hardness of 9 or more, whereas the sub-frame 31 may be formed of a member of Mohs hardness of 6 or more. This also provides the same operational advantage.

Additionally, this invention should not be limited to the embodiments described above. For example, in the first and the second embodiment, for both mating faces 30C and 31C of the base frame 30 and sub-frame 31, the DLC film was formed or the graphite plate was applied. However, for only either one of the mating faces, the above configuration may be adopted. Although not satisfactory, in this case also, the similar advantage can be obtained.

The first to third embodiments were proposed as the configuration of the mating faces of the base frame 30 and the sub-frame 31. However, lubricant doped with fine particles of Teflon (trademark) or Diflon(trademark) may be applied on the mating face(s). This also provides the advantage of giving slidability with low friction to the mating face(s) and making it difficult to generate galling on the mating faces.

Further, as regards the shape of the sub-frame 31 and technique of its position alignment, the detailed structure and technique in the embodiments described above are exemplary, and various modifications thereof can be made.

Further, various modifications can be made for the kind and arrangement of the optical system constituting the optical head. Further, the optical disk to which the optical head device is applied is not only the writable DVD, but may be various optical disks.

What is claimed is:

1. An optical head device for carrying out recording or reproducing of data by irradiating a recording face of an optical disk with a laser beam, comprising:
   a base frame provided with an optical system for guiding the laser beam to the optical disk; and
   a sub-frame provided with a laser output element for outputting the laser bema and fixed to said base frame, wherein
   a diamond-like carbon film is formed on at least one of mating faces of said base frame and said sub-frame.

2. An optical head device for carrying out recording or reproducing of data by irradiating a recording face of an optical disk with a laser beam, comprising:
   a base frame provided with an optical system for guiding the laser beam to the optical disk; and
   a sub-frame provided with a laser output element for outputting the laser bema and fixed to said base frame, wherein
   at least one of mating faces of said base frame and said sub-frame is formed of a graphite plate, and fullerene gel or fullerene sol is applied to the mating face.

3. An optical head device for carrying out recording or reproducing of data by irradiating a recording face of an optical disk with a laser beam, comprising:
   a base frame provided with an optical system for guiding the laser beam to the optical disk; and
   a sub-frame provided with a laser output element for outputting the laser bema and fixed to said base frame, wherein
   one of mating faces of said base frame and said sub-frame is made of a member of Mohs hardness of 9 or more whereas the other thereof is made of a member of Mohs hardness of 6.

4. An optical head device for carrying recording or reproducing of data by irradiating a recording face of an optical disk with a laser beam, comprising:
   a base frame provided with an optical system for guiding the laser beam to the optical disk; and
   a sub-frame provided with a laser output element for outputting the laser bema and fixed to said base frame, wherein
   lubricant doped is applied to mating faces of said base frame and said sub-frame.

5. The optical head device according to claim 4, wherein the lubricant doped includes fine particles of perfluorofluororesin.

* * * * *